Patented June 4, 1935

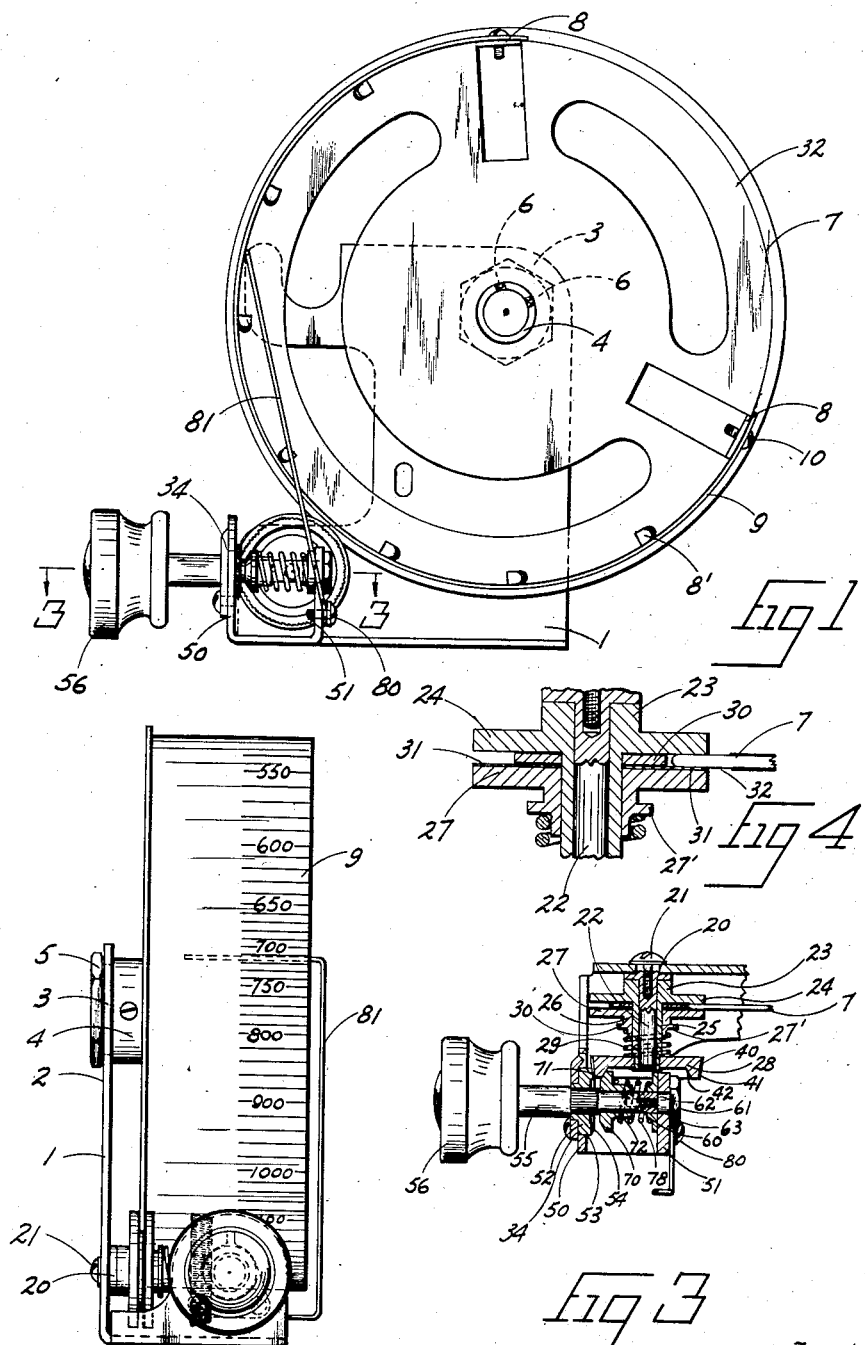

2,003,608

UNITED STATES PATENT OFFICE 2,003,608

TUNING CONTROL

George Roethel, Jr., Chicago, Ill., assignor to E. H. Scott

Application October 26, 1932, Serial No. 639,729

2 Claims. (Cl. 74—10)

This invention relates to an improved device for actuating the tuning control of a radio receiver and more particularly for an improved tuning condenser control.

The objects of the invention are to provide a tuning control which is positive in action and has no lost motion between the various elements.

Another object of the invention resides in a drum type condenser control in which cords or cables as a driving means have been eliminated.

Another object of the invention resides in the provision of the drum type condenser control which is compact, utilizing but a small space for the components thereof.

Another object of the invention is to provide a condenser control that is smooth in operation, economical, and durable in construction.

Still other objects of the invention will become more apparent from the following description of an embodiment thereof together with the accompanying drawing which forms part of this specification.

In the drawing:

Figure 1 is a side elevational view of the invention;

Figure 2 is a front elevational view thereof;

And Figure 3 is a fragmentary sectional view taken on the line 3—3 of Figure 1;

Figure 4 is an enlarged fragmentary section of a portion of the friction drum.

Referring now particularly to the drawing throughout which like parts are designated by like reference characters.

Generally the invention comprises a hub adapted to be locked to the shaft of a rotary condenser and means to rotate the hub including a radial flange on the hub with a frictional clutching mechanism for driving the flange.

More particularly, the device includes a sheet metal bracket 1 for supporting the various parts. The bracket is formed with an upstanding portion 2 having at its upper end a bearing or trunnion portion 3. The connection for the condenser shaft comprises a hub 4 which is rotatably journalled in the bearing 3 and is retained in position by a nut 5 which screws onto a threaded end of the hub. Set-screws 6 are provided which extend radially through the wall of the hub for locking the same to a condenser shaft or the like, not shown.

Extending outwardly from the hub is a radial flange 7 of relatively thin metal which is secured to a reduced end of the hub. The hub being headed over to hold the same in position. Tongues of metal are punched out of the flange body to provide lugs 8 which extend laterally from the flange. The lugs support a translucent indicia strip 9 upon which may be disposed the usual kilocycle marks or the like. The lugs 8 are spaced from the edge of the disc 7. A plurality of smaller lugs 8' are provided to act as guides for the indicia strip and the ends of the strip are secured to the lugs 8 by screws 10.

Driving means for the radial flange 7 is provided at the lower portion of the stationary bracket 1 and includes a bearing 20 which is secured to the frame by a screw 21. The bearing 20 is provided with a shaft 22 upon which is rotatably disposed a friction disc which comprises generally a hub 23 rotatable upon the shaft 22 and having a radial flange 24 extending therefrom. An axial extension 25 of the hub is provided to act as a bearing for a co-operating friction disc. The co-operating friction disc has a hub 26 with a radial flange 27 and is rotatably disposed upon the axial extension 25 of the hub 23.

A driven element 28 is secured to the end of the extension 25 of the hub 23. The spring 29 is disposed over the hub extension 25 and bears against a flange 27' on the friction element 27 and against the back of the driven element 28 urging the two friction elements with their adjoining faces toward each other, the element 26 being slidable longitudinally upon the hub 25. A spacer 30 is also disposed over the shaft 22, between the faces of the friction discs 24 and 27, and is of slightly less thickness than the flange 7. It is also of sufficiently small diameter that it does not contact with the periphery of the flange 7. A thin, flexible friction disc 31 of phosphor-bronze material is provided adjacent the spacer 30, being of the same radial diameter as the friction discs 24 and 27 and is adapted to overlap the edge of the disc 7. The face of the disc 7 is swedged at 32 to provide a sized surface adjacent the edge which is engaged by the friction disc 31. The adjacent faces of the friction elements 24 and 31 are disposed one on each side of the radial flange 7 and due to the action of the spring 29, which transmits pressure through the disc 27 to the disc 31, securely grips the portion 33 of the flange 7 between the adjacent faces of the discs 24 and 31.

The driven element 28 is provided with a laterally extending portion 40, the periphery of which is knurled at 41. The inner surface of the lateral extending portion 40 provides a recess having a slanting wall 42.

The bracket 1 is provided with a pair of upwardly extending parallel walls at 50 and 51, and a driving pinion 52 is journalled in a bearing 34 and extends through an aperture 53 of the wall 50. The pinion is provided with a knurled or serrated surface 54 adapted to co-operate with the surface 41 of the driven member 25 for driving the same. The pinion 52 is secured to a shaft 55 adapted to extend beyond the confines of a receiver chassis, and may extend through the front panel of a console; it is provided at its end with a manual control knob 56.

Means is provided for holding the pinion 52 into close contact with the driven member 25. The shaft 55 is adapted to extend through the wall 51 of the bracket and is held in position by a cap screw 61 which has a bearing portion 62 seated in the aperture 63 of the wall 51. This permits the screw to be tightened to the shaft and provides a relatively easy running bearing, however any suitable bearing and securing means may be provided at this point. A pressure element 70 is provided and has a lateral extending flange 71 with a frusto-conical surface adapted to extend into and engage the inner surface 42 of the driven element 28. The pressure element 70 is also provided with a hub 72 about which is disposed a helical spring 73. A bearing washer 60 is provided for the other end of the spring being slidably disposed on the shaft 55. The spring urges the element 70 into contact with the surface 42 of the driven element retaining the same in close contact under pressure with the pinion 54.

Rotation of the knob 56 imparts rotation to the shaft 55. The pinion and pressure element impart rotation to the driven member 28 which rotates the two friction discs 24 and 31 which grip between their adjacent faces the portion 32 of the flange 7 causing the flange 7 to be rotated which necessarily rotates the hub 4. The hub 4 being secured to the condenser shaft rotates the condenser shaft. The spacer 30 between the friction elements prevents excessive tilting of either of the friction elements with the consequential binding of the same upon the shaft. The third flexible phosphor-bronze disc compensates for slight irregularities in the sized edge 31 of the flange 7 and provides a better frictional grip upon the same.

Secured to the frame portion 51 by a screw 80 is an indicator wire 81 which extends upward behind the indicia strip and indicates the setting of the drum. A light, not shown, is disposed within the drum and the shadow of the wire is cast upon the drum.

Having thus described the invention, it is understood that numerous and extensive departures may be made from the same but without departing from the spirit and scope of the appended claims.

What is claimed as the invention is:

1. In a radio control mechanism, means for actuating a variable tuning control comprising a driving hub adapted to be secured to a condenser shaft, a flange extending radially from the hub, means to rotate the hub by frictional engagement with the edge of said flange comprising a plurality of friction discs disposed in overlapping engagement with the flange, one of said discs being of thin flexible material and held into engagement with the flange by one of the other discs.

2. In a radio tuning control, a driving hub for driving engagement with a condenser shaft, a flange extending radially from the hub, said flange being sized to provide a relieved portion adjacent the edge, means to rotate the flange by friction engagement with said relieved portion comprising a plurality of friction discs overlapping the relieved portion of said flange, one of said friction discs being of relatively thin flexible wear-resisting material adapted to conform to irregularities of the flange, one of said friction discs adapted to bear against said thin disc to hold the same in close frictional engagement with the relieved portion of said flange.

GEORGE ROETHEL, Jr.